United States Patent [19]

Madsen et al.

[11] 4,326,892
[45] Apr. 27, 1982

[54] METHOD OF IMPROVING THE RECOVERY OF SUGAR FROM SUGAR BEETS BY EXTRACTION ON AND APPARATUS FOR CARRYING OUT SAID METHOD

[75] Inventors: Rud F. Madsen; Werner K. Nielsen, both of Nakskov, Denmark

[73] Assignee: Aktieseiskabet de Danske Sukkerfabrikker, Copenhagen, Denmark

[21] Appl. No.: 102,382

[22] Filed: Dec. 11, 1979

[51] Int. Cl.³ .................. C13D 1/08; C13D 1/12
[52] U.S. Cl. .................. 127/43; 127/2; 127/3; 127/5
[58] Field of Search .................. 127/2-6, 127/43

[56] References Cited
FOREIGN PATENT DOCUMENTS
194705  5/1977  U.S.S.R. .................. 127/2

OTHER PUBLICATIONS
Beet Sugar-Kirk-Othmer Ency., vol. 19, pp. 203-220.
Beet-Sugar Tech.-McGinnis 2nd ed., pp. 77-90.

*Primary Examiner*—Michael S. Marcus
*Attorney, Agent, or Firm*—Watson, Cole, Grindle & Watson

[57] ABSTRACT

Method of improving the recovery of sugar from sugar beets comprising washing the sugar beets to remove impurities therefrom, wholly or partially removing the outer layer of the washed sugar beets, slicing the sugar beets thus obtained and extracting the sliced sugar beets with an aqueous solution to form a sugar juice.

Apparatus for wholly or partially removing the surface layer of washed sugar beets, the apparatus comprising two spaced rows of rotatable cylindrical brushes mounted so as to advance sugar beets in the space between the rows while subjecting them to the influence of the brushes to wholly or partially remove the outer layer of the sugar beets.

7 Claims, 1 Drawing Figure

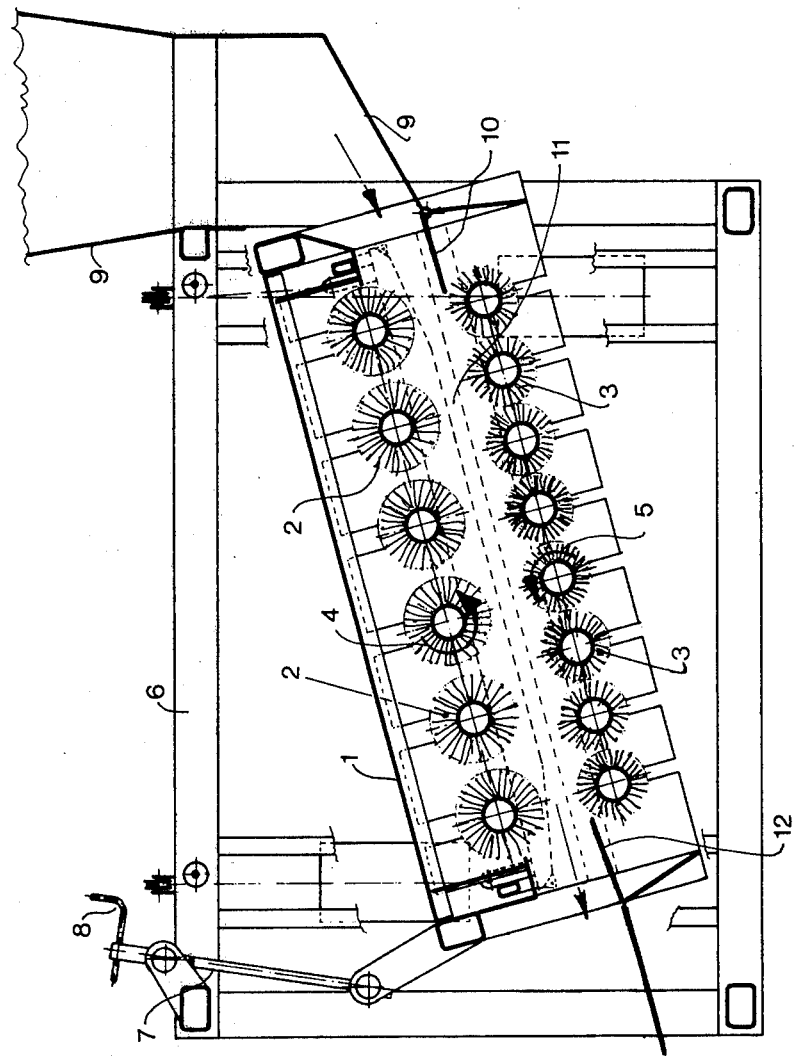

METHOD OF IMPROVING THE RECOVERY OF SUGAR FROM SUGAR BEETS BY EXTRACTION ON AND APPARATUS FOR CARRYING OUT SAID METHOD

BACKGROUND OF THE INVENTION

This invention relates to the recovery of sugar from sugar beets, and more particularly to a method of sugar recovery wherein the sugar beets are washed to remove impurities therefrom, then sliced, and then extracted with an aqueous solution to form a sugar juice.

Prior art methods of the above-mentioned type are known; however, even when carefully effected, the washed beets contain considerable amounts of impurities, such as green organic material, soil and pebbles.

It is well known that the amount of sugar which is lost in the molasses which is a by-product produced in the sugar production, increases with increasing amounts of impurities contained in the raw extracted sugar juice which comes from the washed sugar beets.

The object of the present invention is to increase the yield of sugar contained in the sugar juice obtained by a method of the above-mentioned type.

SUMMARY OF THE INVENTION

The method of the invention is characterized in that subsequent to the washing but before the slicing of the washed sugar beets, the outer layer of the sugar beets is wholly or partially removed.

Although it might be expected that the removal of the outer layer of the sugar beets would result in a simultaneous removal of the impurities because the impurities are present predominantly in the outer layer of the sugar beets, such that the problems created by the presence of these impurities in the extracted sugar juice could consequently be eliminated or reduced, it is surprising that the yield of sugar is increased by such treatment.

Thus, it is surprising that the removal of sugar-containing material from the sugar beets does not result in a loss of sugar which is greater than the loss which is avoided by reducing the amount of impurities in the sugar juice.

The unexpected advantages obtained by the method of the invention are illustrated in the following table which sets forth the sugar content of whole sugar beets, sugar beets from which the surface layer has been removed and the material removed as well as the composition and properties of the raw and purified sugar juice prepared by extraction of these materials. The table sets forth data obtained in three test runs. In the first test run (test run 1) the outer layer of the sugar beets was removed by a paring-knife, in the second run (test run 2) the removal was effected by scraping with a knife and in the third test run (test run 3) the removal of the outer layer was effected by two rows of parallel rotatable cylindrical brushes.

TABLE

| | Test run 1 | | | Test run 2 | | | Test run 3 | | |
|---|---|---|---|---|---|---|---|---|---|
| | Whole beets | Peeled beets | Peel | Whole beets | Scraped beets | Removed material | Whole beets | Brushed beets | Removed material |
| Amount compared to the starting material, % | 100 | 86.3 | 13.7 | 100 | 94.5 | 5.5 | 100 | 95 | 5 |
| Sugar concentration, % | 17.26 | 18.30 | 8.20 | 16.36 | 16.95 | 5.40 | 16.00 | 16.42 | 8.00 |
| Extracted sugar juice*: | | | | | | | | | |
| Sugar concentration, % | 8.59 | 9.15 | 4.10 | 8.18 | 8.45 | 2.70 | 8.00 | 8.21 | 4.00 |
| Purity, % | 90.4 | 93.9 | 62.1 | 85.5 | 88.6 | 44.1 | 88.8 | 91.4 | 49.1 |
| Invert sugar, %/100 rt | 0.50 | 0.24 | 2.55 | 0.40 | 0.25 | 7.60 | 1.11 | 0.44 | 10.00 |
| Purified sugar juice: | | | | | | | | | |
| Sugar concentration, % | 11.17 | 11.90 | 5.33 | 9.41 | 9.75 | 3.11 | 8.96 | 9.20 | 4.48 |
| Purity, % | 93.5 | 97.7 | 68.9 | 89.4 | 92.7 | 57.5 | 93.1 | 95.4 | 60.2 |
| Invert sugar %/100 rt | 0.008 | 0.001 | 0.270 | 0.037 | 0.010 | 1.420 | 0.240 | 0.030 | 2.00 |
| Colour expressed in ICUMSA units | 1270 | 475 | 7268 | 1415 | 714 | 18940 | 1620 | 652 | 9300 |
| Amino nitrogen mg/100 g sugar | 246 | 107 | 1200 | 268 | 169 | 672 | 156 | 87 | 380 |

*The extracted juice was prepared by extracting sugar beet slices with water at a temperature of 70° C. and at a weight ratio of slices to water of 1:1.

As will appear from the table, the removal of the surface layer of the sugar beets results in a sugar juice of a significantly increased purity both in raw and refined state. The increased purity of the sugar juice is of considerable economic value because it reduces the operational costs of sugar production. Thus, the consumption of chemicals, such as lime, soda, sulphur, foam-depressing agents, etc., decreases with decreasing amounts of impurities contained in the sugar juice.

Also the total investment required can be reduced because the necessary investments in centrifuges and apparatuses for end product working and juice purification also decrease with decreasing amounts of impurities in the sugar juice.

Furthermore, the removal of the surface layer of the sugar beets improves the color of the sugar juice obtained by the extraction. Since the color of the sugar juice determines the extent to which the recrystallization is required to obtain white sugar, the improved color significantly reduces the consumption of energy required for the recrystallization process.

The sugar juices obtained in test run 3 were used for the manufacture of sugar and the following results were obtained:

1. Sugar prepared from washed whole sugar beets. As will appear from the table, 100 kg of sugar beets contain 16.00 kg of sugar and the purity of the juice prepared from these sugar beets is 93.11%. The dry substance content of the purified juice is 17.18 kg and 1.18 kg of the dry substance are substances other than sugar. When the purified sugar juice is worked up, 4.0 kg molasses are obtained. The purity of the molasses is 62.5% and the dry substance content thereof is 77.0%. The amount of sugar contained in the molasses is 1.97 kg and the amount of other substances forming part of the dry matter content of the molasses is 1.18 kg. The yield of white sugar is 14.03 kg.

2. Sugar prepared from washed and brushed sugar beets. After brushing 100 kg sugar beets, 95 kg sugar-containing material are obtained. The material removed is 5 kg and the purity of the material is 49.0%. The sugar content is 0.42 kg. The content of other substances is 0.40 kg. The 95 kg brushed sugar beets contain 15.60 kg sugar and the purity of the purified sugar juice obtained from the sugar material is 95.4%. The dry substance content of the purified sugar juice is 15.36 kg, 0.76 kg being substances other than sugar. When the purified sugar juice is worked up, 2.45 kg molasses having a purity of 60% and a dry substance content of 77% are produced. The amount of sugar contained in the molasses is 1.13 kg and the amount of substances other than sugar in the dry substance of the molasses is 0.76 kg. The yield of white sugar is 14.47 kg.

As will appear from the above discussion, the sugar yield is increased in spite of the fact that 5% of the starting material, of which a considerable part is sugar, is removed by the brushing operation.

The removal of the outer layer of the sugar beets may be effected in various ways. Preferably, this removal is effected by peeling, scraping or brushing or by any combination of these treatments.

The material removed from the sugar beets is suitable for use in the production of a fodder which is sold under the trade name "Kosetter" and which is a dried mixture of a major amount of pulp (extracted beet material) and a minor amount (about 20%) of molasses. However, it has now been found that the material removed from the surfaces of the sugar beets may be used as a substitute for part of or the total amount of the relatively expensive molasses present in "Kosetter".

Additonally, it should be mentioned that the removal of the outer layer of the sugar beets, which removal as shown above does not decrease but on the contrary increases the yield of sugar, also has another advantageous effect in commercial sugar production. Thus, the processing of a reduced amount, e.g. 5%, of sugar beets results in a corresponding reduction of the total time during which a given amount of sugar beets is processed in a sugar factory.

The invention also relates to an apparatus for carrying out the method described above. The apparatus of the invention is characterized in that it comprises two spaced rows of rotatable cylindrical brushes which are mounted in a manner, such that sugar beets introduced into the space between the rows are advanced between the rows while being subjected to the influence of the brushes to wholly or partially remove the outer layer of the sugar beets.

One row of rotatable cylindrical brushes is preferably mounted above the other and the brushes of the lower row are mounted so close to one another that sugar beets are prevented from falling down between the brushes.

In the embodiment in which one row of brushes is mounted above the other, the two rows are preferably inclined with respect to the horizontal plane and are mounted in a housing having an upper inlet opening and a lower outlet opening.

By using inclined rows of brushes, the movement of sugar beets through the space between the two rows of rotatable brushes is facilitated.

The apparatus preferably includes means for adjusting the inclination of the rows of brushes so as to optimize the treatment of the sugar beets.

BRIEF DESCRIPTION OF THE ACCOMPANYING DRAWING

The FIGURE on the accompanying drawing shows a vertical sectional view of a preferred embodiment of the apparatus of the present invention.

The FIGURE shows an inclined housing 1 comprising an upper row of rotatable cylindrical brushes 2 and a lower row of rotatable cylindrical brushes 3. The brushes 3 are mounted with a spacing, such that the tips of the brushes are in contact. The two rows of brushes are driven by driving means (not shown) which impart to the brushes a rotation in the directions indicated by arrows 4 and 5.

The housing 1 which is open at its bottom is mounted on a support 6 and the inclination of the housing 1 can be adjusted by raising or lowering the lower end of the housing by a mechanism 7 comprising a hand wheel 8.

A feed funnel 9 having an inclined bottom plate is mounted adjacent to a guide plate 10 which is provided at the upper end of the housing 1. The guide plate 10 serves to guide the sugar beets into the space 11 between the two rows of brushes 2 and 3. A further guide plate 12 is mounted at the lower end of the housing, this guide plate 12 serving to guide the treated sugar beets out of the housing.

In operation, washed sugar beets are introduced into the feed funnel 9. The sugar beets thus introduced are guided into the space 11 between the two rows of rotating brushes 2 and 3 by the guide plate 10. Under the influence of gravity and by the action of the two rows of rotating brushes, the sugar beets are moved towards the lower end of the housing while being strongly brushed to wholly or partially remove their surface layer. The material removed from the sugar beets is carried out of the space 11 by the brushes 3 and is deposited on the floor.

The sugar beets discharged from the apparatus are passed to a slicing machine (not shown).

We claim:
1. A method of increasing the amount of sugar recovered from sugar beets, said method comprising, in sequence, the following steps:
    (a) washing the sugar beets to remove adhered impurities,
    (b) mechanically removing at least a part of the outer layer of each of the washed sugar beets,
    (c) slicing the sugar beets of step (b), and

(d) extracting the sliced sugar beets of step (c) with an aqueous solution to provide a sugar juice rich in sugar.

2. A method as defined in claim 1, wherein the removal of at least a part of the outer layer of said washed sugar beets in step (b) is effected by peeling.

3. A method as defined in claim 1, wherein the removal of at least a part of the outer layer of said washed sugar beets in step (b) is effected by scraping.

4. A method as defined in claim 1, wherein the removal of at least a part of the outer layer of said washed sugar beets in step (b) is effected by brushing.

5. A method as defined in claim 1 wherein a whole outer layer of each of the washed sugar beets is removed in step (b).

6. A method as defined in claim 1, wherein the removed part of the outer layer of each of the sugar beets in step (b) comprises at least 5% of the weight of each of the sugar beets.

7. A method as defined in claim 1, wherein the aqueous solution in step (d) is contacted with the sliced sugar beets of step (c) until the concentration of sugar in the produced sugar juice reaches at least 8.21%.

* * * * *